Figure 1:
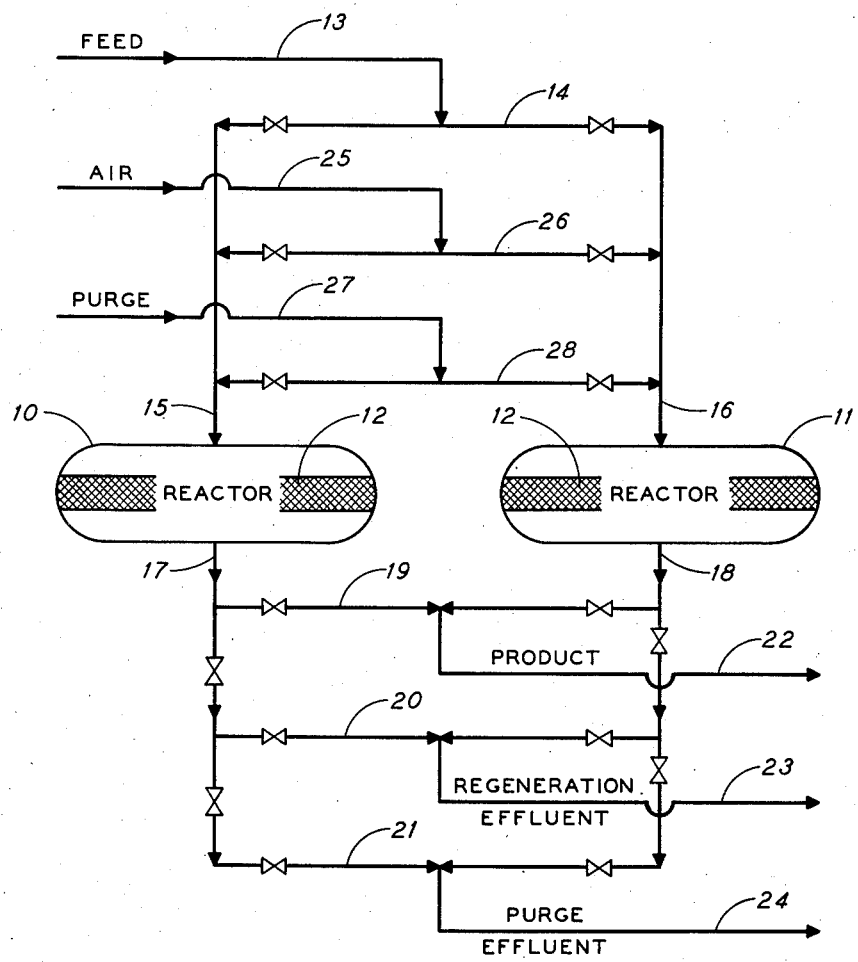

United States Patent Office 2,831,041
Patented Apr. 15, 1958

2,831,041

DEHYDROGENATION PROCESS

Robert P. Sieg, Berkeley, Edward H. Lynch, Manhattan Beach, and Loy G. Horn, Los Angeles, Calif., assignors to California Research Corporation, San Francisco, Calif., a corporation of Delaware Application September 30, 1954, Serial No. 459,452

1 Claim. (Cl. 260—680)

This invention relates to the catalytic dehydrogenation of hydrocarbons and it is more particularly concerned with a process for dehydrogenating butane to n-butenes and butadiene by means of a cyclic, generally adiabatic process wherein, during an endothermic dehydrogenation or conversion step, a carbonaceous deposit is formed on the catalyst surfaces which is burned therefrom during the succeeding exothermic regeneration step in each cycle, thus furnishing the bed with heat for use in the succeeding conversion portion of the cycle.

The invention is generally directed to a method for uniformly heating the catalyst bed and for so regulating the cyclic pattern of the process as to control the net process heat in the system at the desired level. While the invention is applicable in its broadest aspects to a wide variety of hydrocarbon conversion operations, including the dehydrogenation of propane to propene, the catalytic cracking of gas oils to gasoline, the catalytic reforming of naphthas to aromatic compounds, the conversion of ethylbenzene to styrene, and the like, it finds particular utility in the dehydrogenation of butane-containing feeds to butadiene and n-butenes. Accordingly, the invention will generally be described hereinafter as it relates to this reaction.

As indicated above, in dehydrogenation reactions of the type with which this invention is concerned the coke and other carbonaceous deposits laid down on the catalyst surfaces during the conversion step, when burned during the succeeding regeneration step, liberate heat which is retained in the catalyst for use in the subsequent endothermic conversion reaction. Whether or not the amount of carbonaceous deposit so formed will supply all the heat required during the succeeding conversion step depends on the temperature, pressure and other reaction conditions employed. The process is inherently unstable since the net process heat per cycle (defined as the difference between the negative heat of reaction and the positive heat of regeneration) as a function of temperature or pressure slopes up, becoming more positive with increasing temperatures and pressures. While the net process heat is generally positive at average catalyst temperatures above 1100° F. and pressures above 20 in. Hg abs., the use of such conditions is to be avoided since they decrease the dehydrogenation selectivity of the reaction and lead to increased feed losses as a result of undesired cracking reactions. Under the preferred operation conditions (as given below) which result in good conversion of the butane with a high dehydrogenation selectivity, the net process heat is well on the negative side. Since in the practical operation of a large commercial adiabatic reactor the net process heat must be at or near zero, the dehydrogenation of butane under such negative net process heat conditions requires that large amounts of heat be supplied to the system over and above that generated therein during the regeneration portion of the cycle.

It is known from available equilibrium data that low partial pressures are required for the efficient production of diolefins such as butadiene. However, operating pressures below about 5 in. Hg abs. are not practical because of excessive investment and operating costs for compressors, while those above about 20 in Hg abs. lead to undue cracking losses. Within these limits, pressures of from about 6 to 10 in. Hg abs. have been found to be preferable when butadiene is the desired final product, while pressures within the range of from about 10 to 20 in. Hg abs. are preferred when maximum yields of butene are desired.

Operating within the pressure range of from 5 to 20 in. Hg abs., it has been found that total conversions of approximately 70 to 90%, coupled with dehydrogenation selectivity values of from about 55 to 65%, can be obtained by the use of average catalyst temperatures falling in the range of from about 1000 to 1100° F., the average temperature being taken as the average of the values prevailing in the bed at the start and at the finish of the conversion step. At temperatures below 1000° F., conversion falls off at a rapid rate and the dehydrogenation equilibrium becomes less favorable for the production of diolefins, while at temperatures above 1100° F. secondary reactions such as cracking occur which decrease dehydrogenation selectivity, and there is serious danger of forming hot spots in the catalyst bed and thus destroying the utility thereof. The term "total conversion," as employed herein, is the sum of the respective butane and butene conversions and assumes that all butane converted goes first to butenes, the butane conversion being the weight percent of butane in the feed minus the weight percent of butane in the product, times 100, and the butene conversion being the weight percent of butene in the feed plus the butane conversion and minus the weight percent of butene in the product (all times 100). The term "total dehydrogenation selectivity," as employed herein, is a function of the calculated, ultimate yield of butadiene from butane converted (said ultimate yield being found by measuring the weight percent of butadiene in the product, less any in the feed, and adding to this figure that obtained by calculating the amount of butadiene which can be obtained from the weight percent of butenes produced during the conversion assuming that the latter can be converted to butadiene at 68.6% yield in a subsequent dehydrogenation process), and is determined by dividing the ultimate yield of butadiene by the butane conversion, times 100.

In order to compensate for the negative net process heat encountered in dehydrogenating butane under the optimum conditions of temperature and pressure described above, a number of methods have been developed whereby heat is supplied to the catalyst bed over and above that imparted thereto during the regeneration step. One such method which is commonly employed is to pass preheated air through the catalyst during the regeneration step in amounts well in excess of those required to burn off the carbonaceous impurities present on the catalyst, thereby using the sensible heat content of this excess air for adding heat to the catalyst bed. This method, though effective, is expensive both in equipment investment as well as in operation due to the large heat and power requirements imposed. In order to minimize the difficulties associated with the use of such a corrective air blow, resort is frequently had to auxiliary heat supply means. Thus, in one such method a small amount of air is supplied along with the feed during part or all of the conversion step, thus burning a portion of the feed stock. This method has the disadvantage that the resulting heat increment is not uniformly distributed throughout the catalyst since burning occurs primarily at those bed portions lying nearest the feed inlet. Another method is to supply a heavy stock such as a gas oil or fuel oil along with the feed in order to increase the amount of coke deposited in the catalyst. Here again, however, there is a strong tendency for hot spots to form in the bed near the feed inlet due to the relatively heavier deposition of the coke in this portion of the bed. Still another method is to increase the severity of the reaction conditions, thus increasing coke production relative to endothermic dehydrogenation. This method is inefficient in that it causes disproportionately large losses of valuable feed stocks for a given increase in net process heat.

In view of the above drawbacks of the various available auxiliary methods for imparting heat to the catalyst bed, it would be desirable if there could be found an internal method (i. e. one inherent in the catalytic process) which would provide a degree of control of the process net heat and thus provide a means for establishing and maintaining reactor temperature within the desired range.

It is also desirable to establish a dehydrogenation method of the type described above whereby the process may be operated at conditions which will give the highest selectivity for dehydrogenation reactions with a minimum of side reactions such as cracking and coking, as well as high per pass conversions, yet a method which is consistent with practical conditions of operation and which holds plant investment and operating costs at the lowest possible figure.

The present invention is based on the discovery of a unique method for providing additional positive net heat, uniformly distributed throughout the catalyst bed, along with a method whereby the additional heat so obtained can be employed to compensate for the negative net heat obtained at the preferred operating conditions and conversion levels. More particularly, it has been found that in a cyclic adiabatic reaction conducted under otherwise negative net process heat conditions, said negative net heat per cycle can be increased to zero or even a positive value by so adjusting the on-stream time of the reaction (i. e. the conversion portion of the cycle) that the negative net process heat is offset to the desired extent by heat generated uniformly within the catalyst bed as portions of the feed are burned by sorbed oxygen present on the catalyst surface, the term "sorbed" being employed herein to cover oxygen present on the catalyst surface in either the chemisorbed, physically adsorbed or chemically combined form. This method takes advantage of the tendency of high surface area catalysts, preferably those of the chromia-alumina type employed in dehydrogenation reactions, to sorb oxygen from regeneration gases, which sorbed oxygen in turn reacts with the incoming feed (or other reducing gas) at the initiation of the conversion portion of the cycle to produce additional heat throughout the catalyst bed.

While the net amount of heat liberated in this fashion is a function of catalyst properties, oxygen partial pressure in the regeneration gas, and the efficiency of any purging operation (normally conducted with evacuation, steam or other inert gas prior to introducing the feed in order to reduce explosion hazards), this heat is a fixed amount each cycle, assuming constant operating conditions, and is substantially independent of space rates and on-stream time since burning and removal of sorbed oxygen is complete in the first minute or two of the conversion period. On the other hand, the negative process net heat per cycle is a function of the total quantity of feed processed per cycle and hence is dependent on space rate and time on-stream. That is to say, for a given space rate, pressure and conversion level, obtainable with various times on-stream and catalyst temperatures, the negative process net heat is the same per unit weight of feed, but is proportional to on-stream time on a per cycle basis assuming a constant feed rate. Thus, by adjusting on-stream time to give a negative net heat per cycle just equal to the positive heat effect per cycle due to sorbed oxygen on the catalyst, an over-all zero net process heat can be obtained which will permit minimum use of external corrective methods such as the stabilizing air blow.

If desired, instead of burning the hydrocarbon feed proper (e. g., butane) with the sorbed oxygen on the catalyst surface, a less valuable combustible refinery gas such as flue gas, methane, propane or the like can be admixed with or substituted for the feed gas for an appropriate interval (e. g., about 0.5 to 2 minutes) at the initiation of the conversion cycle, with the operation then being resumed for the balance of the conversion period with the introduction of the desired butane or other hydrocarbon-containing feed to be dehydrogenated. However, since the amount of hydrocarbon lost by reason of combustion with the sorbed oxygen in conformity with a practice of this invention is normally only in the order of 0.1 to 2% of the total feed, it may be preferred not to complicate the process by the introduction of other gases into the reactor unless a further purpose can be served thereby.

The catalyst to be employed in the present invention can be any conventional dehydrogenating catalyst having a surface area of at least 20 $m.^2/g$. Representative catalysts falling into this category are those made up of chromium oxide deposited on activated alumina of the Bayer process, precipitated or gel types. As regards the dehydrogenation of butane, the preferred catalyst is one containing from 5 to 30% chromium oxide deposited on such activated aluminas. The catalyst may be used in any suitable physical form such as granules, pellets or spheres.

While it is now the practice in the art to admix the catalyst particles with from about 25 to 75% of an inert heat retention medium such as fused alumina or alundum, which medium acts as a "thermal flywheel" and thus prevents unduly wide fluctuations in temperature within the catalyst during the operating cycle, the content of such a medium in the catalyst is preferably reduced to a value below 25% or is even omitted altogether in a practice of this invention. Instead, the reactor is provided with the maximum amount of catalyst commensurate with available reactor volume, thereby taking the fullest advantage of the process heat to be derived by virtue of the presence of sorbed oxygen and also permitting an increase in the throughput capacity of the reactor. Quite surprisingly, it has been found that as the total conversion value is kept below 90% by the use of average conversion temperatures below about 1100° F. and pressures in the range of about 5 to 20 in. Hg abs., the tendency of the catalyst temperatures to diverge or vary in different limits or parts of the catalyst bed, or to fluctuate widely between the regeneration and the reaction steps is greatly reduced. Again, as the on-stream or conversion portion of the cycle is progressively shortened to take more advantage of the compensating heat factor attributable to sorbed oxygen, the over-all extent of such temperature fluctuations is reduced still further.

While the process of this invention is applicable to a moving bed process of either the Thermofor or fluid-type, it is particularly well adapted for employment with a fixed bed process consisting of a multiple reactor plant equipped with manifolds for supplying feed gases, regeneration air and purge gases to all reactors and for receiving the product streams therefrom, along with the necessary motor valves and timing devices whereby each reactor can individually go through the conventional cycle, i. e., on-stream with feed for a period, purging, regeneration, purging, and then back to feed. Accordingly, in the accompanying drawing there is shown an arrangement of apparatus of said fixed bed type which is suitable for carrying out the process of this invention.

Referring more particularly to the drawing, there is shown at 10 and 11 a pair of reaction chambers arranged to be alternately on-stream and in regeneration, or on purge, and with each reactor being provided with a body of chromia-alumina catalyst 12. Butane-containing feed is introduced through line 13 which connects to a feed inlet manifold 14 having inlet connections 15 and 16 leading to the respective reactors 10 and 11. Outlet connections 17 and 18 lead from the respective reactors and connect to outlet manifolds 19, 20 and 21, each of which manifolds is provided with a discharge line, as indicated at 22, 23 and 24. The regeneration medium, preferably air, is introduced through line 25 to a manifold 26 which connects with inlet lines 15 and 16, while the purge gas, which generally comprises steam or other gas which contains substantially no free oxygen, is supplied through line 27 to manifold 28 which also connects to the feed inlet lines to the reactors. When the apparatus goes on-stream, feed is supplied through line 13 and manifold 14 to one of the reactors, while the other reactor is on the regeneration portion of the cycle with air being supplied thereto through line 25 and manifold 26, all as controlled by suitable settings of the valves shown in the drawing. From the reactor which is on-stream, the mixture of product gases is withdrawn through manifold 19 and is discharged through line 22 to a suitable product recovery system (not shown) from which any desired portion of the product gases (e. g., unconverted butane) can be recycled back to line 13. The effluent gas from the reactor on regeneration is discharged through manifold 20 and line 23. At the end of the regeneration and on-stream cycles, which normally are of the same duration, both reactors are preferably placed on purge, with a suitable purge gas being introduced through line 27 and manifold 28 to each of the reactors, and with the purge effluent gas from the reactors being withdrawn through lines 17 and 18, manifold 21, and the lead-off line 24. At the end of the purge cycle, the reactor which formerly was on regeneration is now supplied with feed, while the other reactor is supplied with air for regeneration, the process being alternated in this fashion indefinitely.

The length of the respective on-stream, purge and regeneration cycles is normally controlled by a conventional cycle timer drive, and by providing the same with a variable speed control device, minor changes in on-stream times can be effected, thereby providing a ready means for adjusting over-all process net heats and hence affording the desired internal method for controlling reactor temperatures. That is, reactor temperatures may be raised by reducing on-stream time since, with shorter reaction times (other factors remaining the same) conversion is increased and with it the coke lay-down, while the relative contribution per cycle of heat attributable to sorbed oxygen also becomes greater. On the other hand, reactor temperatures can be lowered by lengthening on-stream time, thus lowering conversion and reducing the relative contribution of the sorbed oxygen to the over-all net process heat, per cycle. Expressed otherwise, decreasing the length of the on-stream cycle (and normally that of the regeneration cycle as well, since both are either of the same duration or are a fixed percentage of the total cycle time) has the effect of reducing any negative net process heat, while lengthening the cycle has the effect of increasing any net process heat deficiency.

The manner in which the present invention finds specific application is illustrated by the data presented in the following examples wherein the reaction conditions employed are within the preferred operating range.

EXAMPLE I

A butane feed stream is passed through a bed of catalyst containing 20% by weight of $Cr_2O_3$ deposited on activated alumina and having a surface area of 40 m.²/gm., in a suitable reactor vessel for a period of 15 minutes at a rate of 0.4 v./v./hr. (i. e. volumes of butane, calculated as liquid, per superficial volume of catalyst, per hour, the actual rate being 100 pounds of butane per hour to 6.88 cu. ft. of catalyst), and at an average catalyst temperature of 1025–1035° F. and pressure of 6–8 in. Hg abs., the total conversion under these conditions being 80±10% and the dehydrogenation selectivity being approximately 60±5%, as an average for each cycle. Following this reaction period, the reactor was purged with inert gas for a period of two minutes, after which the catalyst was regenerated by burning in air for 15 minutes, with the system then being evacuated to reaction pressures for removal of air from the void spaces in the catalyst bed. This cycle was repeated indefinitely. Under these conditions it was found that the net process heat, taking into effect only the negative heat of reaction, and the positive heat of regeneration and the positive heat supplied as butane feed was burned by sorbed oxygen at the initiation of the on-stream portion of the cycle, was −500 B. t. u.'s per cycle. As the operation was repeated, using 12 minutes on-stream and regeneration times and with the temperature being lowered somewhat (i. e., by about 10° F.) so as to maintain the average total conversion at 80% and dehydrogenation selectivity at 60%, the deficiency in net process heat per cycle was reduced to −120 B. t. u.'s. By reducing the times to 10 minutes, again with a further moderate decrease in temperature so as to maintain constant conversion and dehydrogenation selectivity, it was found that instead of there being a negative net process heat, the same was now plus 180 B. t. u.'s, per cycle. From the above data, it is seen that at a throughput rate of approximately 0.4 v./v./hr., the optimum on-stream period for a total conversion level of 80±10% is approximately 10 to 12 minutes.

EXAMPLE II

When the process of the foregoing example is repeated using a throughput rate of 0.5 v./v./hr., it is found that the optimum on-stream time is from about 8 to 10 minutes, as is borne out by the data of Table I below.

Table I

[Basis: 100 lb./hr. n-butane feed; space rate 0.5 liq. v./v./hr.; catalyst, 20% $Cr_2O_3$—80% $Al_2O_3$, 40 m.²/gm. surface area, adsorbs 0.5 std. cu. ft. $O_2$/cu. ft. catalyst at 1100° F. with air at 1 atm.]

| Time on-stream, minutes | 5 | 8 | 10 | 15 |
|---|---|---|---|---|
| Av. cat. temp. for 80 total conv./°F | 1,010 | 1,020 | 1,030 | 1,045 |
| Lbs. feed per cycle | 8.3 | 13.4 | 16.7 | 25 |
| Heat of reaction, B. t. u./cycle | −5,610 | −8,976 | −11,220 | −16,830 |
| Heat of regeneration, B. t. u./cycle | +4,920 | +7,872 | +9,840 | +14,760 |
| Heat from chemisorbed $O_2$, B. t. u./cycle | +1,245 | +1,245 | +1,245 | +1,245 |
| Over-all process net heat, B t. u./cycle | +555 | +141 | −135 | −825 |

EXAMPLE III

When the operation of Example I is repeated using a throughput rate of 0.75, the optimum on-stream period is approximately 6 to 8 minutes if the over-all net process heat is to be held at a substantially zero value. This is evidenced by the data of Table II below.

Table II

[Basis: 100 lb./hr. n-butane feed; space rate 0.75 liq. v./v./hr.; catalyst 20% $Cr_2O_3$—80% $Al_2O_3$.]

| Time on-stream, minutes | 5 | 7 | 9 | 12 |
|---|---|---|---|---|
| Av. cat. temp. for 80 total conv./° F | 1,040 | 1,048 | 1,055 | 1,065 |
| Lbs. feed per cycle | 8.3 | 11.7 | 15 | 20 |
| Heat of reaction, B. t. u./cycle | −5,610 | −7,854 | −10,098 | −13,480 |
| Heat of regeneration, B. t. u./cycle | +4,920 | +6,888 | +8,856 | +11,800 |
| Heat from chemisorbed $O_2$, B. t. u./cycle | +933 | +933 | +933 | +933 |
| Over-all process net heat, B. t. u./cycle | +245 | −33 | −309 | −747 |

EXAMPLE IV

When the process of the foregoing example is repeated using a throughput rate of 1.0 v./v./hr., it is found that the optimum on-stream time was from about 4 to 5 minutes, as is borne out by the data of Table III below.

Table III

[Basis: 100 lb./hr. n-butane feed; space rate 1.0 liq. v./v./hr.; catalyst, 20% Cr$_2$O$_3$—80% Al$_2$O$_3$.]

| Time on-stream, minutes | 3 | 5 | 10 | 15 |
|---|---|---|---|---|
| Av. cat. temp. for 80 total conv./°F | 1,058 | 1,066 | 1,084 | 1,102 |
| Lbs. feed per cycle | 5 | 8.3 | 16.7 | 25 |
| Heat of reaction, B. t. u./cycle | −3,370 | −5,610 | −11,220 | −16,830 |
| Heat of regeneration, B. t. u./cycle | +2,950 | +4,920 | +9,840 | +14,760 |
| Heat from chemisorbed O$_2$, B. t. u./cycle | +622 | +622 | +622 | +622 |
| Over-all process net heat, B. t. u./cycle | +202 | −68 | −758 | −1,448 |

It will be seen from the data of the foregoing examples that as progressively more rapid throughput ratios are employed, it becomes necessary to limit on-stream times to shorter and shorter periods if the system is to be maintained in heat balance by internal methods, as described above. However, as the throughput rate exceeds 1.0 v./v./hr., this period becomes so short as to render the process commercially unattractive, since an unduly large proportion of the total time is taken up by non-productive operations such as valve changes, purges and the like, which normally are constant no matter what the duration of the on-stream or regeneration times. On the other hand, when the throughput rate is materially below 0.4 v./v./hr., the capacity of the unit falls off to such an extent as also to make the operation commercially unattractive. Accordingly, in dehydrogenating butane under the preferred operating conditions employed in the examples (namely, at a total conversion level of about 80±10% and a dehydrogenation selectivity of about 60±5%, as obtained by operation at pressures of from 5 to 20 in. Hg abs. and temperatures between 1000 and 1100° F.) the process of this invention is most attractive from the commercial standpoint when a butane-containing feed to be dehydrogenated is passed through the chromia-alumina catalyst of high surface area at a space rate of from about 0.4 to 1.0 v./v./hr., with a more preferred rate being 0.5 to 0.8 v./v./hr.

We claim:

In a process wherein butane is catalytically dehydrogenated by the practice of a cyclic adiabatic operation involving successive hydrocarbon conversion and catalyst regeneration operations, with intervening purging treatments of the catalyst-containing reaction zone, the steps comprising effecting the hydrocarbon conversion by passing a butane-containing feed stream through a bed of a particulate dehydrogenation catalyst which is substantially free of any intermixed, inert heat retention medium, said catalyst having a high surface area and containing a substantial amount of sorbed oxygen, at a through-put rate of from about 0.4 to 1 v./v./hr., the duration of said hydrocarbon conversion step being varied from a period of about 12 minutes at a through-put rate of about 0.4 v./v./hr. to one of about 4 minutes at a through-put rate of about 1.0 v./v./hr., said conversion being effected at an average catalyst temperature of from about 1000 to 1100° F. and at a pressure of from about 5 to 20 in. Hg abs. whereby there is obtained a total conversion of about 80±10% and a dehydrogenation selectivity of about 60±5%, said process being characterized by the establishment of the net process heat at a value near zero.

References Cited in the file of this patent
UNITED STATES PATENTS

| | | |
|---|---|---|
| 2,440,525 | Roetheli | Apr. 27, 1948 |
| 2,474,014 | Seebold | June 21, 1949 |